United States Patent
Mustalahti et al.

(10) Patent No.: US 8,312,978 B2
(45) Date of Patent: Nov. 20, 2012

(54) PEOPLE MOVER, TRANSMISSION CHAIN AND METHOD IN THE USE OF A PEOPLE MOVER

(75) Inventors: Jorma Mustalahti, Hyvinkää (FI); Arttu Hult, Helsinki (FI); Nithil Karimpanackal Natarajan, Helsinki (FI); Raimo Pelto-Huikko, Vantaa (FI); Aki Metsänen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/053,562

(22) Filed: Mar. 22, 2011

(65) Prior Publication Data

US 2011/0220455 A1    Sep. 15, 2011

Related U.S. Application Data

(63) Continuation of application No. PCT/FI2009/000088, filed on Oct. 22, 2009.

(30) Foreign Application Priority Data

Sep. 22, 2008  (FI) .................................... 20080533

(51) Int. Cl.
*B66B 21/10* (2006.01)
*B66B 23/02* (2006.01)
*F16G 13/18* (2006.01)

(52) U.S. Cl. ......... 198/326; 198/329; 198/330; 474/245

(58) Field of Classification Search ............ 198/326, 198/329, 330, 332, 334; 474/206, 230, 245
See application file for complete search history.

(56) References Cited

U.S. PATENT DOCUMENTS

| | | | | |
|---|---|---|---|---|
| 2,163,693 | A * | 6/1939 | Margles ........................ | 198/332 |
| 2,602,345 | A | 7/1952 | Braumiller | |
| 3,916,709 | A * | 11/1975 | Steuer et al. .................. | 474/242 |
| 4,232,783 | A * | 11/1980 | Kraft ............................. | 198/851 |
| 4,643,704 | A * | 2/1987 | Honda .......................... | 474/245 |
| 5,020,654 | A * | 6/1991 | Sansevero et al. ............ | 198/328 |
| 5,318,485 | A * | 6/1994 | Bateman ....................... | 474/245 |
| 5,325,955 | A * | 7/1994 | Ahls et al. .................... | 198/332 |
| 5,435,428 | A * | 7/1995 | Adachi et al. ................ | 198/324 |
| 6,390,270 | B1 * | 5/2002 | Utsunomiya et al. ......... | 198/326 |
| 6,832,678 | B2 * | 12/2004 | Ogura et al. .................. | 198/322 |
| 7,159,705 | B2 * | 1/2007 | Ogimura et al. .............. | 198/326 |
| 7,500,549 | B2 * | 3/2009 | Aulanko et al. .............. | 198/321 |
| 7,568,571 | B2 * | 8/2009 | Ogimura et al. .............. | 198/332 |
| 8,106,706 | B2 * | 1/2012 | Easwaran et al. ............. | 327/538 |
| 2003/0132087 | A1 | 7/2003 | Inoue | |

OTHER PUBLICATIONS

International Search Report of PCT/FI2009/000088 Mailed December 18, 2009.

* cited by examiner

*Primary Examiner* — Douglas Hess

(74) *Attorney, Agent, or Firm* — Venable LLP; Robert Kinberg

(57) ABSTRACT

A people mover comprising a plurality of steps or palettes to carry and move people. A transmission chain formed into an endless loop is connected to the steps or palettes via which the steps or palettes are moved. The transmission chain comprises consecutive chain links connected in a hinged manner to each other such that the chain links are bendable in relation to each other in a first direction (I) and in a second direction (II). Two turning elements are provided around which the transmission chain is arranged to pass. The consecutive chain links of the transmission chain bend in relation to each other in the first direction (I) when passing around the respective turning elements. A bending limitation mechanism is arranged to limit bending of the transmission chain occurring in the second direction (II).

23 Claims, 3 Drawing Sheets

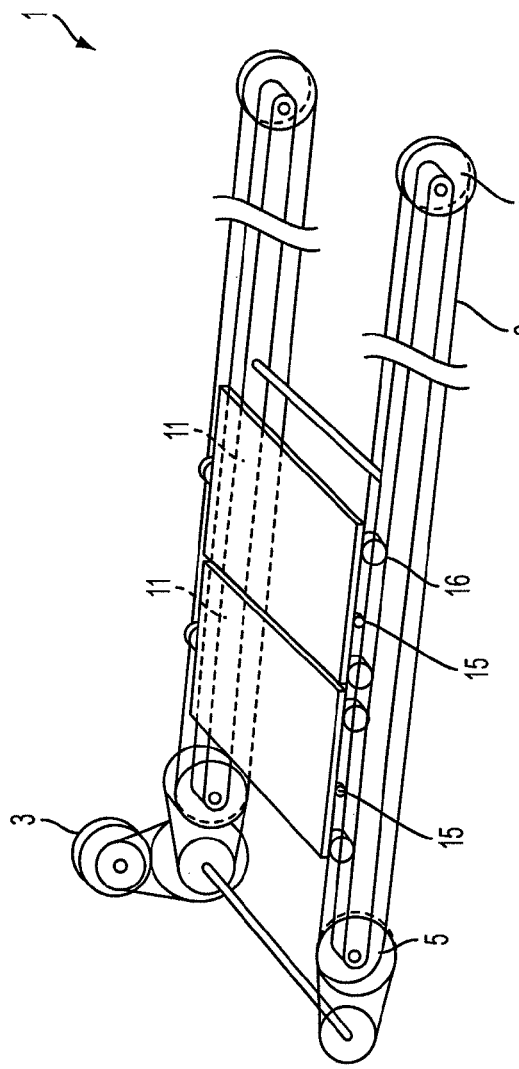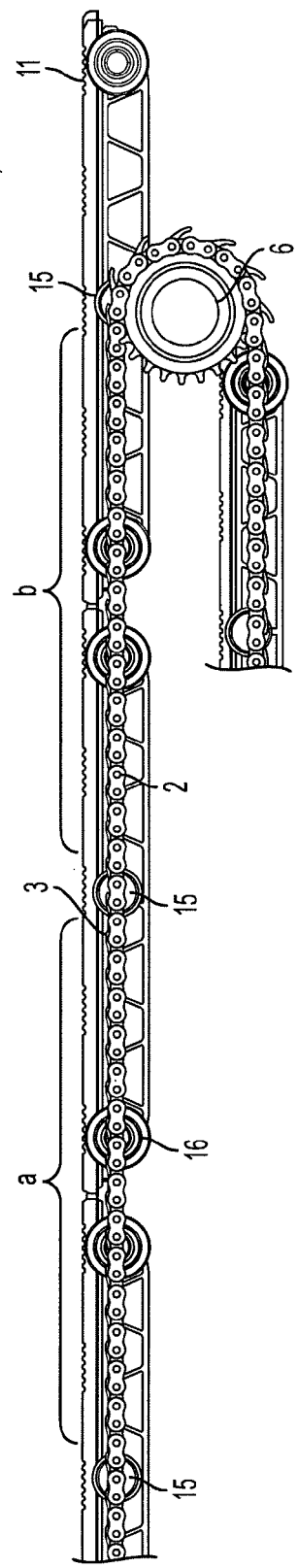

PEOPLE MOVER, TRANSMISSION CHAIN AND METHOD IN THE USE OF A PEOPLE MOVER

CROSS-REFERENCE TO RELATED APPLICATIONS

This application is a continuation of International Application No. PCT/FI2009/000088, filed Oct. 22, 2009, designating the United States and claiming priority to Finnish Application No. 20080533, filed on Sep. 22, 2008.

FIELD OF THE INVENTION

The invention relates to a people mover, more particularly a travelator or the like, that comprises a plurality of steps or palettes for carrying and moving people, and a transmission chain formed into an endless loop connected to the aforementioned steps or palettes, via which the steps or palettes of the people mover are moved. The transmission chain comprises consecutive chain links connected in a hinged manner to each other such that the chain links are able to bend in relation to each other in a first direction (I) and in a second direction (II). The transmission chain is arranged to pass around at least two turning elements. Consecutive chain links of the transmission chain bend in relation to each other in the first direction (I) when passing around the turning elements. The invention additionally relates to a transmission chain of a people mover and a method for reducing jerking of a people mover.

BACKGROUND OF THE INVENTION

In prior-art travelator arrangements people are moved on consecutive pallets, which form a continuous moving track. The pallets are connected to each other with a transmission chain, by which the pallets are moved. The chain is connected to a pallet with, for instance, a pin in the center part of the pallet, which pin is mounted on a bearing that allows the palette to rotate in relation to the pin. A problem in known arrangements is the sag of the transmission chain. The transmission chain sags between the fixing points of the consecutive pallets owing to the weight of the transmission chain. This sag is dependent on the tightening force of the transmission chain, which in turn is dependent on the number of people on the travelator and their distribution in the longitudinal direction of the travelator. The tightening force therefore can be of a different magnitude at different points of the transmission chain. That being the case, the sag is also of a different magnitude at different points of the conveyor. In addition, the tightening force varies as a consequence of the change in loading state as a result of the moving of the load. Passengers often walk along the conveyor and thus move from one pallet to another. When a passenger moves from one pallet to another, the rolling friction of both pallets changes. Likewise if a passenger happens to jump, a large backwards-and-forwards variation occurs in the rolling friction. In addition, when a passenger steps onto a pallet at the end of a travelator, the tightening force increases along the entire length of the travelator. Correspondingly, a passenger can step off the palette track of the travelator at either end of the track. The sag of the transmission chain of the travelator enables a small change in the distance between the pallets when the loading changes. Thus jerking in the longitudinal direction of the travelator is produced as a consequence of the aforementioned changes occurring in the loading. Such jerking impairs ride comfort.

In some situations the sag of the transmission chain can be hazardous because a sagging chain can reach to touch the stationary parts of the travelator, which causes noise and wear of the parts.

An object of the invention, among others, is to eliminate the aforementioned drawbacks of known arrangements. Other objects of the invention are to produce a more advanced people mover, preferably a travelator or the like, a more advanced method in the use of a people mover and a more advanced transmission chain. A further purpose of the invention is to produce a people mover with a more advanced transmission.

Advantages of the invention include, but are not limited to, a people mover in which the sag of the transmission chain is reduced; ride comfort is improved; noise is reduced; wear of parts is reduced and service life of the parts improved.

Furthermore, a travelator and a method may be achieved in which movement between the pallets, in the longitudinal direction of the travelator, can be reduced.

SUMMARY OF THE INVENTION

The above and other objects are achieved according to one aspect of the invention, wherein there is provided a people mover, which in one embodiment, comprises: a plurality of steps or palettes to carry and move people; a transmission chain formed into an endless loop, connected to the steps or palettes and via which the steps or palettes are moved, wherein the transmission chain comprises consecutive chain links connected in a hinged manner to each other such that the chain links are bendable in relation to each other in a first direction (I) and in a second direction (II); two turning elements around which the transmission chain is arranged to pass, wherein the consecutive chain links of the transmission chain bend in relation to each other in the first direction (I) when passing around the respective turning elements; and a bending limitation mechanism arranged to limit bending of the transmission chain occurring in the second direction (II).

In one embodiment of the invention the transmission chain comprises the aforementioned bending limitation mechanism occurring in the second direction.

In another embodiment of the invention the aforementioned bending limitation mechanism is provided in at least a part of the chain links of the transmission chain.

In a further embodiment of the invention the section of the transmission chain that is between the coupling elements of immediately consecutive palettes comprises a mechanism for limiting bending of that section of the transmission chain occurring in the second direction (II).

In another embodiment of the invention the aforementioned bending limitation mechanism in a chain link comprises a stop face, arranged to hit some part of a chain link in the proximity of it when the chain links bend in relation to each other in the second direction and to prevent the bending of immediately consecutive chain links in relation to each other farther in the direction.

In another embodiment of the invention the transmission chain comprises a plurality of chain links, which comprise a bending limitation mechanism.

In a further embodiment of the invention the people mover comprises a plurality of consecutive pallets or the like, each of which is connected to the transmission chain with a coupling element, and the section of the transmission chain between the coupling elements of immediately consecutive pallets comprises a plurality of chain links provided with the aforementioned bending limitation mechanism.

In one embodiment of the invention the section of transmission chain between the coupling elements of immediately consecutive pallets is limited against bending occurring in the second direction for essentially its entire length with a bending limitation mechanism in at least a part of the chain links of the section.

In another embodiment of the invention the bending of a chain link that is immediately behind a chain link provided with a bending limitation mechanism in the second direction, in relation to the aforementioned chain link provided with the bending limitation mechanism, past the determined extreme position of the bending limitation mechanism is prevented with the bending limitation mechanism and bending away from the extreme position in the first direction is permitted. This can be done such that the bending of immediately consecutive chain links in relation to each other is permitted to occur farther in the first direction (i.e. farther from the parallel position) than in the second direction.

In one embodiment of the invention the aforementioned immediately consecutive chain links are at an angle in relation to each other of about 0-1 degree, preferably about 0-0.5 degrees, when in the extreme position.

In one embodiment of the invention the aforementioned immediately consecutive chain links are parallel when in the extreme position.

In one embodiment of the invention the sections of chain between consecutive coupling elements each comprises a plurality of chain links, the bending of which in the second direction is limited with the aforementioned mechanism such that each of the aforementioned pluralities of consecutive links forms a sequence of links that is rigid only in the second direction.

In one embodiment of the invention consecutive sections between coupling elements of palettes are connected to each other such that the sequence of links that is rigid only in the second direction and that is in one section is able to bend in relation to the sequence of links that is rigid only in the second direction and that is in the next consecutive section in the direction essentially past the parallel position of the rigid sequences of links.

In one embodiment of the invention a chain link of the transmission chain, to which a coupling element is connected, is arranged to bend over the parallel position in relation to the chain link immediately in front of it and/or immediately behind it in the aforementioned second direction.

In one embodiment of the invention essentially the whole transmission chain is limited with the aforementioned bending limitation mechanism against bending occurring in the second direction.

In one embodiment of the invention the mechanism for limiting bending of the transmission chain occurring in the second direction comprises a guide surface, supported by which and along with which the transmission chain moves. The chain between immediately consecutive coupling elements is essentially on a horizontal plane.

In one embodiment of the invention the section of the transmission chain between the coupling elements of immediately consecutive pallets is continuously rigid in the second direction II when the immediately consecutive pallets in question are on the outgoing section and are available for use by passengers.

According to another aspect of the invention, there is provided a transmission chain for a people mover for connecting to steps or palettes of the people mover, which in one embodiment, comprises: consecutive chain links, which are connected in a hinged manner to each other such that the chain links are able to bend in relation to each other in a first direction (I) and in a second direction (II); and a bending limitation mechanism to limit bending of the transmission chain in the second direction (II), wherein chain links of the transmission chain comprise at least a part of the bending limitation mechanism, wherein the chain links comprise at least two parallel plates set at a distance from each other with chain pins and bushings connecting the plates, wherein one of the two parallel plates includes the bending limitation mechanism, the one plate comprising a protrusion extending in a longitudinal direction of the chain link, and wherein the protrusion comprises a stop face arranged to hit a second stop face of a plate comprising a bending limitation mechanism of a proximate chain link.

The plate formed to be a bending limitation mechanism may be a plate of uniform thickness, for example a metal plate. The plates formed into the bending limitation mechanism arranged to hit each other in this way may be similar to each other.

In one embodiment of the invention each second link of the transmission chain comprises a plate formed into a bending limitation mechanism, and consecutive plates formed into bending limitation mechanisms are on the same plane as each other.

In one embodiment of the invention a plate formed into a bending limitation mechanism participates in transmitting the traction that is exerted on the transmission chain in the longitudinal direction of the chain. One advantage is the simplicity of the structure.

In this case the transmission chain is not able to bend in the direction II. Thus with the arrangements it is advantageous to keep essentially the whole of the outgoing section of the transmission chain continuously essentially straight. The sections of the transmission chain between the coupling elements do not thus sag even momentarily when they are available for use by a passenger on the outgoing section. Since a section of chain between coupling elements is continuously rigid in the second direction, distancing of immediately consecutive pallets from each other caused by straightening of the chain section when subjected to tensile load does not occur. The rigidity of the chain sections in the second direction can be achieved with the aforementioned bending limitation mechanism. Sagging in this way is continuously prevented irrespective of the longitudinal tractive tension exerted on the transmission chain.

According to a further aspect of the invention there is provided a method in the use of a people mover to reduce jerking in a longitudinal direction of the people mover, the people mover comprising a plurality of steps or palettes to carry and move people, a transmission chain formed into an endless loop connected to the steps or palettes and via which transmission chain the steps or palettes are moved, the transmission chain comprising consecutive chain links, connected in a hinged manner to each other such that the chain links are bendable in relation to each other in a first direction (I) and in a second direction (II), wherein the transmission chain is arranged to pass around at least two turning elements, consecutive chain links of the transmission chain bending in relation to each other in the first direction (I) when passing around the at least two tuning elements, the method, in one embodiment, comprising: limiting the bending of the transmission chain occurring in the second direction (II).

In this case bending of the transmission chain is permitted in the first direction I farther (i.e. farther from the parallel position) than in the second direction II. This can be done e.g. with the mechanism incorporated in the transmission chain for limiting bending of the transmission chain occurring in the second direction. In this way the bending of the section of the transmission chain between the coupling elements of immediately consecutive palettes occurring in the second direction is limited.

In one embodiment of the method of the invention, bending of the section of the transmission chain that is between the coupling elements of immediately consecutive palettes is limited in the second direction (II), which limitation is made with the mechanism incorporated in that section of the transmission chain for limiting the bending of the transmission chain occurring in the second direction (II). In this case bending is permitted in the first direction (I) farther (i.e. farther from the parallel position) than in the second direction (II).

In another embodiment of the invention sagging of the section of the transmission chain between the coupling elements of immediately consecutive pallets is continuously prevented when the immediately consecutive pallets in question are on the outgoing section and are available for use by passengers, with the mechanism for limiting bending of the transmission chain occurring in the second direction (II) incorporated in the transmission chain itself.

In a further embodiment of the invention sagging may be continuously prevented irrespective of the longitudinal tractive tension exerted on the transmission chain, the advantage of which is a structure that does not flex disadvantageously owing to tension fluctuations.

BRIEF DESCRIPTION OF THE DRAWINGS

In the following, the invention will be described in detail by the aid of some embodiments with reference to the attached drawings, wherein FIG. 1 is a schematic perspective view of an embodiment of a people mover according to the invention.

FIG. 2 is a side schematic view showing details of the people mover of FIG. 1, which comprises a transmission chain according to the invention.

DETAILED DESCRIPTION

Figure 3:
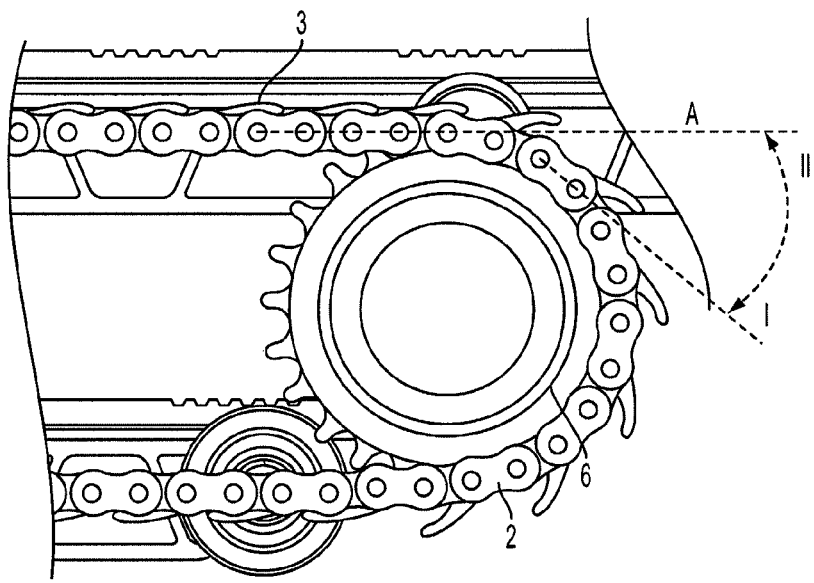
FIG. 3 is a side view showing magnified details of FIG. 2.

Referring to FIG. 1, there is shown a people mover 1 according to the invention. The people mover 1 is a travelator, wherein the palettes conveying passengers are arranged to move supported on rolls 16 with guides. The palettes 11 are arranged consecutively to form a continuous conveying surface (only some of the pallets are shown) and are connected to a transmission chain 2 with coupling elements 15. The transmission chain 2 is arranged to move the palettes 11 with the power transmitted from a motor 3. The transmission chain 2 is of the articulated chain type, which comprises consecutive chain links connected in a hinged manner to each other such that the chain links are able to bend in relation to each other in a first direction (I) and in a second direction (II), which first direction and second direction are opposite to each other. The transmission chain is formed into an endless loop and passes around turning elements 5 and 6, which are preferably gear wheels. The chain bends when passing around turning elements 5 and 6 so that consecutive chain links of the transmission chain bend in relation to each other in the first direction I. The people mover 1 comprises a mechanism for limiting bending of the transmission chain occurring in the second direction (II), preferably at least on the upper section of the people mover. In the illustrated embodiment, the chain is limited against bending in the second direction II. For this purpose the transmission chain 2 a comprises special mechanism (not shown in FIG. 1) for limiting bending of the transmission chain occurring in the second direction (II). The aforementioned mechanism for limiting bending comprises a bending limitation mechanism 3 in at least a part of the chain links of the transmission chain. The bending limitation can be implemented in different ways. In one embodiment the bending limitation mechanism 3 is incorporated in a chain link and comprises a stop face, which is arranged to hit some part of a proximate chain link when the chain links bend in relation to each other in the second direction (II) and to prevent their bending in relation to each other farther in the direction (II). The preferred structural options of the bending limitation mechanism are described in more detail in conjunction with FIGS. 2-5.

FIGS. 2 and 3 present details of a people mover 1 according to the invention. The people mover comprises a plurality of consecutive pallets, each of which is connected to the transmission chain 2 with a coupling element 15. A section (a,b) of the transmission chain 2 between the coupling elements 15 of immediately consecutive pallets comprises a plurality of chain links 4 provided with the aforementioned bending limitation mechanism 3. The whole section (a,b) between the coupling elements 15, may be limited against bending in this way, in which case the chain links of the section (a,b) form a sequence of links that is rigid only in the second direction II. That being the case, bending of the sequence of links over the essentially parallel position of the links of the sequence of links is prevented in the second direction II. In this way the sag between the coupling elements 15 can be reduced or it can even be completely eliminated.

The transmission chain according to the invention comprises consecutive links. The bending of immediately consecutive links in relation to each other in the second direction (II) over the determined extreme position (A) of the bending limitation is prevented with a bending limitation mechanism 3 in at least one of the aforementioned consecutive links. Bending away from the extreme position (A) in the first direction (I) is permitted such that the bending of the chain links in relation to each other is permitted farther in the first direction (I) than in the second direction (II). This means that consecutive links are able, when bending in the direction I, to bend in relation to each other farther, measured as an angle, from the parallel position than when bending in the direction II. When bending back in the direction II, the bending of the links past the extreme position A is prevented. The extreme position A is a position in which the aforementioned consecutive links are parallel or at least very close to the parallel position (0-1 degree). In this way the bending ability of the transmission chain in the second direction is reduced, as a consequence of which the sag of the chain decreases. This effect is advantageous particularly in the upper part of the transmission chain, where the dead weight of the chain endeavors to bend the chain in the direction II and where the tightening force is at its greatest. It is thus endeavored to reduce bending of this direction with the bending limitation mechanism.

It is possible to implement the limitation of bending in different ways. The bending limitation mechanism can, for example, be connected to each link or to each second link depending on the type of bending limitation mechanism or arrangement that is desired to solve the problem.

Figure 4:
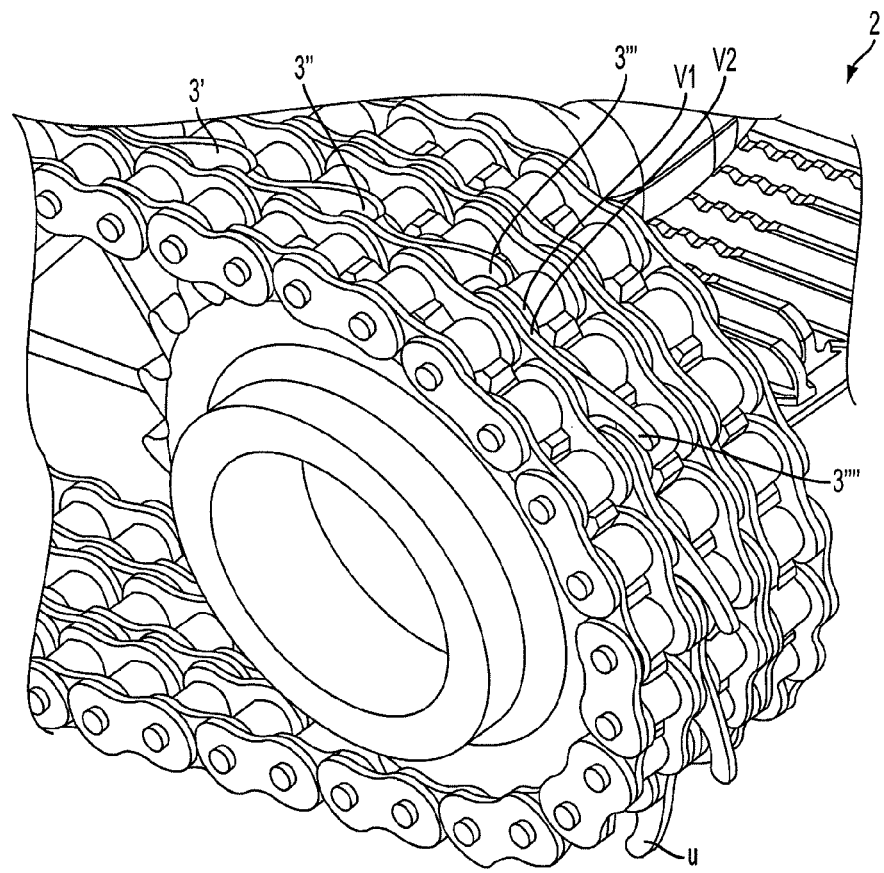
FIG. 4 is a three-dimensional view of a transmission chain of the people mover according to the invention.

FIG. 4 presents a three-dimensional drawing of a part of the transmission chain 2 utilized in the people mover of FIGS. 1-3. The chain is preferably formed to be a so-called triple row chain, but it could also be formed to be a 1-row, 2-row or 4-row chain. The figure illustrates how the transmission chain 2, which in the figure proceeds clockwise and passes around the turning element 5, starts to bend in the direction I at the point of the turning element 6, in which case the consecutive chain links leave their essentially parallel extreme position A. In this case the bending limitation elements 3 detach from contact with the chain link in their proximity. In the figure the bending limitation element that is marked with the reference number 3' is in contact with the bending limitation element marked with the reference number 3". In the figure the bottom surface of the protrusion of the bending limitation element 3' forms a stop face V1, which in its extreme position A is set against the stop face V2 formed by the top surface of the bending limitation element 3". In the figure the stop face V1 of the bending limitation element 3''' is detached from the stop face V2 of the element 3'''', because the chain links, to which they are fixed, have bent away from an essentially parallel position because the chain has bent in the first direction I.

Figure 5:
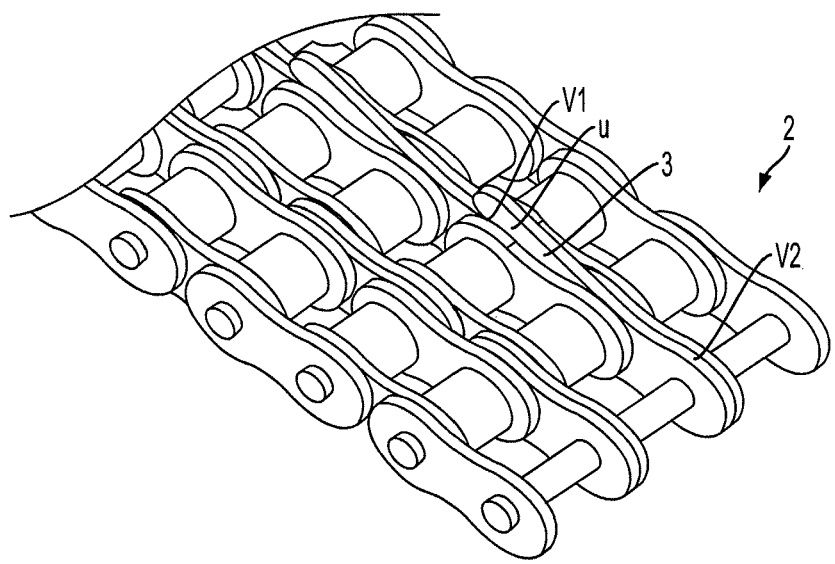
FIG. 5 is a three-dimensional view of a transmission chain of the people mover according to the invention.

FIG. 5 is a three-dimensional view of the transmission chain according to the invention, which is presented earlier in FIGS. 2-4. The chain links are parts that hinged consecutively and behave as essentially one rigid piece of the transmission chain. The chain links comprise two parallel plates set at a distance from each other with chain pins, bushings or the like, but could also comprise more than two. One of the plates of each second chain link is formed into a bending limitation mechanism 3. The plate in question comprises a protrusion u extending in the longitudinal direction of the chain link/chain, which protrusion comprises a stop face V1, arranged to hit the stop face V2 of the plate on the same plane formed into a bending limitation mechanism of a chain link in proximity of it, when the chain links reach the essentially parallel extreme position A as the chain bends in the second direction II. Each bending limitation mechanism thus comprises a stop face V2 and a stop face V1. The mechanisms 3 are level plates of even thickness, which form the side plate of every second chain link, and which extend over the following plates that are on the same plane preventing bending of the immediately following link over the parallel position of the links in the direction II. The structure of the links is illustrated further in FIG. 6.

Figure 6:
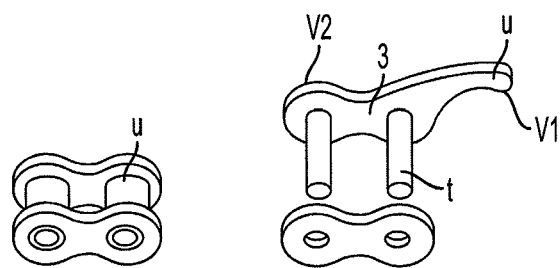
FIG. 6 is a three-dimensional exploded view of the structure of the chain links of a transmission chain of the people mover according to the invention.

FIG. 6 presents an exploded illustration of consecutive links of a transmission chain according to the invention, which in an actual transmission chain 2 are placed consecutively one after the other. The parts presented form an elongated chain placed in a consecutively overlapping sequence. The embodiments shown in FIGS. 1-5 present three parallel sequences of links fixed to each other with common pins, but from the viewpoint of the functioning of the invention one chain link sequence provided with the mechanism 3 is sufficient, e.g. by sequencing the links according to FIG. 6 alone one after the other. The plates of the so-called inner link presented on the left in the figure are at a distance from each other and between them is a bushing h, inside which the pin t of the so-called outer link, presented on the right in the figure, in the actual chain is placed. Thus the chain links are able to bend in a hinged manner in relation to each other. A further separate bushing or roll for the sprocket wheel contact is preferably on top of the bushings. The protrusion u is preferably so long that the bending limitation mechanism extends in the longitudinal direction of the chain essentially the distance of the interval between two pins.

The transmission chain 2 of the people mover according to the invention is limited against bending in the second direction II preferably for its whole length. At the point of the coupling elements 15 the bending limitation can in some arrangements however be unnecessary, in which case it is sufficient that most of the section (a,b) between the coupling elements behaves as a rigid essentially parallel sequence of links only in the second direction II. In this case the sections (a and b) can be connected to each other such that the sequence of links in section (a) that is rigid only in the second direction (II) is able to bend in the direction (II) in relation to the sequence of links in the section (b) that is rigid only in the second direction (II) essentially past the parallel position of the rigid sequences of links. An advantage is that sagging of the chain on the return side is enabled. This can be implemented e.g. such that a chain link of the transmission mechanism, to which a coupling element 15 is connected, is arranged to bend past the parallel position in relation to the chain link immediately in front of it and/or immediately behind it in the aforementioned second direction (II) e.g. by omitting the bending limitation mechanism 3 from that point.

The coupling mechanism 15 is preferably fixed to the hinge pin(s) of the transmission chain 2 and fitted to a palette in a manner that allows rotation. The palettes most preferably remain in the horizontal position on both the outgoing side and on the return side of the travelator.

The transmission chain is formed into an endless loop, and in the following the inner surface refers to the surface of the chain within the area bounded by the inner side of the chain loop and the outer surface refers to the surface of the chain in the area that remains outside the chain loop. When it is bending in the first direction I the inner surface of an individual chain link of the chain bends towards the inner surface of the chain link that is in front of or behind the chain link in question. When bending in the second direction II the outer surface of an individual chain link of the chain bends towards the outer surface of the chain link that is in front of or behind the chain link in question. The same applies to longer sections of the chain, which sections are formed of a number of consecutive chain links.

As presented above, the people mover 1 comprises a mechanism for limiting bending of the transmission chain occurring in the second direction II. In the embodiment presented above the transmission chain 2 comprises this type of mechanism.

In a second embodiment of the people mover according to the invention the bending limitation mechanism is a guide track arranged for the transmission chain, along which the chain passes with support, e.g. by sliding. The guide track is preferably on at least the upper outgoing section of the travelator, but it could also be on the lower return section. In this embodiment the guide track supports the chain from below. The chain can be any prior-art articulated chain whatsoever. What is essential is that the transmission chain sections between the coupling elements 15 are kept essentially straight on the top track. The people mover comprises a plurality of consecutive pallets 11 or the like, each of which is connected to the transmission chain with a coupling element 15. Thus, the people mover comprises immediately consecutive pallets or the like, the section of the transmission chain between the coupling elements 15 being limited against bending in the second direction II by a guide track supporting the section of transmission chain in question, e.g. with a continuous level metal surface for the whole distance between the turning elements (diverting pulleys) 5 and 6. With this arrangement at least the chain between immediately consecutive chain links on the top track of the conveyor is on an essentially horizontal plane for its whole length and the chain links are parallel.

In the method of using the people mover according to the invention, more particularly for reducing jerk or jerking in the longitudinal direction of the people mover, bending of the transmission chain occurring in the second direction (II) is limited. In this case bending of the transmission chain is permitted farther in the first direction I (i.e. farther from the parallel position) than in the second direction II. This can be done e.g. with the arrangements presented elsewhere in this application with the mechanism incorporated in the transmission chain for limiting bending of the transmission chain occurring in the second direction. In this way it is possible to reduce bending occurring in the second direction of the section of the transmission chain that is between the coupling elements of immediately consecutive palettes and via that relative movement between immediately consecutive palettes. This can be done with the mechanism incorporated in that section of the transmission chain for limiting the bending of the transmission chain occurring in the second direction (II). In this case bending of the section is permitted in the first direction (I) farther (i.e. farther from the parallel position) than in the second direction (II). Sagging of the section (a,b) of the transmission chain (2) that is between the coupling elements (15) of immediately consecutive pallets is prevented most preferably continuously when the immediately consecutive pallets in question are on the outgoing section and are available for use by passengers, with the mechanism 3 incorporated in the people mover, preferably incorporated in the transmission chain, for limiting bending of the transmission chain 2 occurring in the second direction (II). Sagging is in this way continuously prevented irrespective of the longitudinal tractive tension exerted on the transmission chain. Thus, for example, the chain is not able to sag and then straighten again e.g. when the load changes, which would cause jerking of the palettes.

The conveyor 1 presented is most preferably such that in a change of direction the palette bends so that it is in the same attitude (e.g. in a horizontal attitude) on the outgoing section and on the return section.

It is obvious to the person skilled in the art that the invention is not limited to the embodiments described above, in which the invention is described using examples, but that many adaptations and different embodiments of the invention are possible within the frameworks of the inventive concept defined by the claims presented below. This it is obvious that although in FIG. 1 the palettes are moved with transmission chains on both sides, the invention can also be applied in solutions in which there is only one transmission chain. It is also obvious that the invention can also be utilized in different people movers, such as in travelators, escalators, moving ramps and the like. In this case the part performing the function corresponding to a palette can be e.g. a step.

What is claim is:

1. A people mover comprising:
 a plurality of steps or pallets to carry and move people;
 a transmission chain formed into an endless loop, connected to the steps or pallets and via which the steps or pallets are moved, wherein the transmission chain comprises consecutive chain links connected in a hinged manner to each other such that the chain links are bendable in relation to each other in a first direction (I) and in a second direction (II);
 two turning elements around which the transmission chain is arranged to pass, wherein the consecutive chain links of the transmission chain bend in relation to each other in the first direction (I) when passing around the respective turning elements; and
 a bending limitation mechanism arranged to limit bending of the transmission chain occurring in the second direction (II).

2. The people mover according to claim 1, wherein the transmission chain comprises the bending limitation mechanism.

3. The people mover according to claim 1, wherein the steps or pallets each include coupling elements coupled to the transmission chain, and respective sections of the transmission chain between the coupling elements of immediately consecutive steps or pallets comprise the bending limitation mechanism.

4. The people mover according claim 3, wherein immediately consecutive chain links are at an angle in relation to each other of about 0-1 degree when in an extreme position.

5. The people mover according to claim 4, wherein the angle is about 0-0.5 degrees.

6. The people mover according to claim 4, wherein the immediately consecutive chain links are parallel when in the extreme position.

7. The people mover according to claim 3, wherein the sections of the chain between the consecutive coupling elements each comprise a plurality of consecutive chain links, the bending of which in the second direction (II) is limited with the bending limitation mechanism such that each of the pluralities of consecutive links forms a sequence of links that is rigid only in the second direction (II).

8. The people mover according to claim 3, wherein immediately adjacent sections are connected to each other such that the sequence of links that is rigid only in the second direction (II) and that is in one section of immediately adjacent sections is able to bend in the second direction (II) in relation to the sequence of links that is rigid only in the second direction (II) and that is in the other of the immediately adjacent sections essentially over the parallel position of the rigid sequence of links.

9. The people mover according to claim 3, wherein one chain link of the transmission chain to which a coupling element is connected, is arranged to bend over a parallel position in relation to a chain link immediately in front of it and/or immediately behind the one chain link in the second direction (II).

10. The people mover according to claim 3, wherein the section of the transmission chain between the coupling elements of immediately consecutive pallets is continuously rigid in the direction (II) when the corresponding immediately consecutive pallets are on an outgoing section that is available for use by passengers.

11. The people mover according to claim 1, wherein the chain links of the transmission chain comprise at least a part of the bending limitation mechanism.

12. The people mover according to claim 11, wherein the bending limitation mechanism comprises a stop face arranged to hit a part of a proximate chain link when the chain links bend in relation to each other in the second direction (II) to prevent bending of immediately consecutive chain links in relation to each other farther in the second direction (II).

13. The people mover according to claim 11, wherein the steps or palettes each include coupling elements coupled to the transmission chain, and a section of the transmission chain between the coupling elements of immediately consecutive steps or palettes comprises a plurality of chain links provided with the bending limitation mechanism.

14. The people mover according to claim 13, wherein the section of the transmission chain between the coupling elements of immediately consecutive pallets is limited against bending occurring in the second direction (II) for essentially its entire length, wherein the bending limitation mechanism is in at least a part of the chain links of the section.

15. The people mover according to claims 11, wherein the bending of a chain link that is immediately behind a chain link provided with the bending limitation mechanism over a determined extreme position of the bending limitation mechanism in the second direction (II) in relation to the chain link provided with a bending limitation mechanism is prevented with the bending limitation mechanism and bending away from the extreme position in the first direction (I) is permitted such that the bending of the chain links in relation to each other is permitted farther in the first direction (I) than in the second direction (II).

16. The people mover according to claim 1, wherein the transmission chain comprises a plurality of chain links which comprise a bending limitation mechanism.

17. The people mover according to claim 1, wherein substantially the whole transmission chain is limited against bending occurring in the second direction (II) with the bending limitation mechanism.

18. A transmission chain for a people mover for connecting to steps or pallets of the people mover, comprising:
consecutive chain links, which are connected in a hinged manner to each other such that the chain links are able to bend in relation to each other in a first direction (I) and in a second direction (II); and
a bending limitation mechanism to limit bending of the transmission chain in the second direction (II), wherein chain links of the transmission chain comprise at least a part of the bending limitation mechanism, wherein the chain links comprise at least two parallel plates set at a distance from each other with chain pins and bushings connecting the plates, wherein one of the two parallel plates includes the bending limitation mechanism, the one plate comprising a protrusion extending in a longitudinal direction of the chain link, and wherein the protrusion comprises a stop face arranged to hit a second stop face of a plate comprising a bending limitation mechanism of a proximate chain link.

19. The transmission chain according to claim 18, wherein each second link of the transmission chain comprises a plate including a bending limitation mechanism, and consecutive plates including the bending limitation mechanism are on the same plane as each other.

20. The transmission chain according to claim 18, wherein the plate including the bending limitation mechanism transmits traction exerted on the transmission chain in the longitudinal direction of the chain.

21. A method in the use of a people mover to reduce jerking in a longitudinal direction of the people mover, the people mover comprising a plurality of steps or pallets to carry and move people, a transmission chain formed into an endless loop connected to the steps or pallets and via which transmission chain the steps or pallets are moved, the transmission chain comprising consecutive chain links, connected in a hinged manner to each other such that the chain links are bendable in relation to each other in a first direction (I) and in a second direction (II), wherein the transmission chain is arranged to pass around at least two turning elements, consecutive chain links of the transmission chain bending in relation to each other in the first direction (I) when passing around the at least two tuning elements, the method comprising:
limiting the bending of the transmission chain occurring in the second direction (II).

22. The method according to claim 21, wherein the transmission chain is coupled to the respective steps or pallets by coupling elements on each step or pallets, and wherein the limiting step includes limiting bending of a section of the transmission chain between the coupling elements of immediately consecutive pallets in the second direction (II) by a bending limitation mechanism incorporated in said section of the transmission chain.

23. The method according to claim 21, including continuously preventing sagging of the section of the transmission chain between the coupling elements of immediately consecutive steps or pallets when the immediately consecutive steps or pallets are on an outgoing section and are available for use by passengers.

* * * * *